United States Patent
Bentley

(10) Patent No.: US 7,950,286 B2
(45) Date of Patent: May 31, 2011

(54) MULTI-RANGE PRESSURE SENSOR APPARATUS AND METHOD UTILIZING A SINGLE SENSE DIE AND MULTIPLE SIGNAL PATHS

(75) Inventor: Ian Bentley, New Ipswich, NH (US)

(73) Assignee: Honeywell International Inc., Morristown, NJ (US)

(*) Notice: Subject to any disclaimer, the term of this patent is extended or adjusted under 35 U.S.C. 154(b) by 108 days.

(21) Appl. No.: 12/389,042

(22) Filed: Feb. 19, 2009

(65) Prior Publication Data

US 2010/0154551 A1 Jun. 24, 2010

Related U.S. Application Data

(60) Provisional application No. 61/139,319, filed on Dec. 19, 2008.

(51) Int. Cl.
*G01L 9/00* (2006.01)
(52) U.S. Cl. .......................................... 73/753
(58) Field of Classification Search ................ None
See application file for complete search history.

(56) References Cited

U.S. PATENT DOCUMENTS

| | | | |
|---|---|---|---|
| 3,484,732 A | 12/1969 | Postma | |
| 4,478,076 A | 10/1984 | Bohrer | |
| 4,478,077 A | 10/1984 | Bohrer | |
| 4,501,144 A | 2/1985 | Higashi et al. | |
| 4,574,640 A | 3/1986 | Krechmery | |
| 4,581,928 A | 4/1986 | Johnson | |
| 4,651,564 A | 3/1987 | Johnson et al. | |
| 4,683,159 A | 7/1987 | Bohrer et al. | |
| 4,986,127 A | 1/1991 | Shimada et al. | 73/714 |
| 5,042,307 A * | 8/1991 | Kato | 73/708 |
| 5,050,429 A | 9/1991 | Nishimoto et al. | |
| 5,099,695 A * | 3/1992 | Sugano et al. | 73/708 |
| 5,187,985 A * | 2/1993 | Nelson | 73/708 |
| 5,193,393 A * | 3/1993 | Czarnocki | 73/708 |
| 5,460,050 A * | 10/1995 | Miyano | 73/766 |
| 5,507,171 A * | 4/1996 | Mattes et al. | 73/1.15 |
| 5,544,529 A * | 8/1996 | Mitani et al. | 73/716 |
| 5,578,962 A * | 11/1996 | Rastegar | 330/9 |
| 6,047,244 A | 4/2000 | Rud, Jr. | |
| 6,169,965 B1 | 1/2001 | Kubisiak et al. | |
| 6,223,593 B1 | 5/2001 | Kubisiak et al. | |
| 6,234,016 B1 | 5/2001 | Bonne et al. | |
| 6,502,459 B1 | 1/2003 | Bonne et al. | |

(Continued)

OTHER PUBLICATIONS

Celerity, "Dual Range Transducer Display," 2 pages, 2006.

(Continued)

*Primary Examiner* — Andre J Allen
(74) *Attorney, Agent, or Firm* — Seager Tufte & Wickhem LLC

(57) ABSTRACT

A multi-range pressure sensor apparatus and method that provide multiple signal paths for detecting a broad range of pressures with a high accuracy. A pressure transducer can be configured to include the use of a pressure sense die with piezoresistive elements integrated into the sensor die and in a Wheatstone bridge configuration. A sensed output signal from the sense die can be transferred to one or more amplifier circuits. A programmable compensation circuit can be utilized to multiplex different amplified output signals from each of the amplifier circuits and to provide a digital output. A memory associated with the programmable compensation circuit provides separate compensations, which are stored for each of the different signal paths and removes errors due to amplifier gain and offset.

26 Claims, 3 Drawing Sheets

U.S. PATENT DOCUMENTS

| | | |
|---|---|---|
| 6,542,594 B1 | 4/2003 | LeBoulzec |
| 6,653,959 B1 | 11/2003 | Song |
| 7,146,864 B2 | 12/2006 | Sullivan et al. ............ 73/861.42 |
| 7,185,538 B2 | 3/2007 | Hager et al. |
| 7,239,957 B1 | 7/2007 | Sweet et al. |
| 7,266,999 B2 | 9/2007 | Ricks |
| 7,318,351 B2 | 1/2008 | Cobianu et al. ................. 73/715 |
| 7,343,812 B2 | 3/2008 | Stewart et al. |
| 2002/0083776 A1* | 7/2002 | Tanizawa ........................ 73/753 |
| 2003/0056597 A1* | 3/2003 | Wang ............................. 73/718 |
| 2004/0144178 A1* | 7/2004 | Ohmi et al. ..................... 73/708 |
| 2006/0037403 A1* | 2/2006 | Yeh et al. ........................ 73/708 |
| 2006/0144156 A1* | 7/2006 | Borzabadi et al. .............. 73/754 |
| 2007/0000330 A1 | 1/2007 | Tysoe et al. ..................... 73/700 |
| 2007/0069000 A1 | 3/2007 | Schubert ....................... 228/246 |
| 2007/0186681 A1 | 8/2007 | Shkarlet et al. ................. 73/715 |
| 2007/0197922 A1 | 8/2007 | Bradley et al. ................ 600/488 |
| 2007/0289387 A1 | 12/2007 | Stewart et al. ................... 73/717 |
| 2008/0107151 A1 | 5/2008 | Khadkikar et al. ........... 374/141 |
| 2008/0196507 A1 | 8/2008 | Lamb et al. ..................... 73/756 |
| 2009/0073274 A1 | 3/2009 | Dai |

OTHER PUBLICATIONS

Martel Electronics, "PPC-3300 Precision Dual Range Pressure Calibrator," 2 pages, 2002.

* cited by examiner

MULTI-RANGE PRESSURE SENSOR APPARATUS AND METHOD UTILIZING A SINGLE SENSE DIE AND MULTIPLE SIGNAL PATHS

CROSS-REFERENCE TO PROVISIONAL APPLICATION

This application claims priority to U.S. Provisional Patent Application Ser. No. 61/139,319, entitled "Multi-Range Pressure Sensor Apparatus and Method Utilizing a Single Sense Die and Multiple Signal Paths," which was filed on Dec. 19, 2008 and is incorporated herein by reference.

TECHNICAL FIELD

Embodiments are generally related to sensor devices, methods, and systems. Embodiments are also related to multi-range pressure sensor devices capable of detecting a variety of parameters under varying conditions.

BACKGROUND OF THE INVENTION

The need for accurate, low cost, compact pressure sensors capable of a broad range of measurement is becoming increasingly necessary in a variety of commercial, industrial, military and other applications. Measurement of a broad range of pressures is particularly challenging because of an enormous range of pressures that can be realized. Conventional pressure sensors possess an extremely limited range of pressure measurement capabilities and often cannot be operated over their maximum potential measuring ranges due to their technical design. Additionally, when an anticipated force exceeds the capacity of an individual pressure sensor, multiple pressure sensors having ranges of measurement adjoining one another must be utilized simultaneously.

Furthermore, the arrangement of multiple sensors is correspondingly more complicated. The output signals of the sensors are generally not compatible with one another and must therefore be evaluated in an additional, external electronic circuit in order to recognize which of the sensors is functioning in the permitted range of measurement at a given moment. In such an approach, excessive expenditures of time and money are required to incorporate multiple sensors within a single system. In addition, such the use of two or more independent pressure sensors requires protective valves to avoid damage with respect to more accurate sensors at high pressures.

Based on the foregoing, it is believed that a need exists for an improved multi-range pressure sensor apparatus that is capable of efficiently detecting a broad range of pressures with high accuracy and in a very narrow range, as described in greater detail herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved pressure sensor apparatus, system, and method.

It is another aspect of the present invention to provide for an improved pressure sensor apparatus, system, and method that incorporates the use of a single sense die and multiple signal paths for detecting broad ranges of pressures with high accuracy.

It is a further aspect of the present invention to provide for an improved method, apparatus, and system for removing errors due to amplifier gain and offset.

The aforementioned aspects and other objectives and advantages can now be achieved as described herein. A multi-range pressure sensor apparatus, method, and system having multiple signal paths for detecting broad ranges of pressures with high accuracy are disclosed. A pressure transducer can be configured that includes a pressure sense die with piezoresistive elements integrated into a sensor die in a Wheatstone bridge configuration. A sensed output signal from the sense die can be transferred to one or more amplifier circuits. A programmable compensation integrated circuit can be utilized to multiplex different amplified output signals from each of the amplifier circuits and to provide a digital output. A memory associated with the programmable compensation integrated circuit can be configured to provide separate compensations stored with respect to each of the different signal paths and capable of removing errors due to amplifier gain and offset.

The multiple signal paths from the amplifier circuits with potentially different compensation values stored for each path can generate high accuracy compensations at a low system cost. Each path of the multiple signal paths possesses a different gain that is capable of providing multiple compensated ranges in the pressure sensor. In one embodiment, the amplifier circuits of the pressure sensor can be integral to the sense die and/or integral to the programmable compensation circuit. In another embodiment, the amplifier circuits may be isolated to provide error free output generated due to amplifier gain and offset. Such a multi-range pressure sensor apparatus provides a broad measurement range and high accuracy in a very narrow range.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
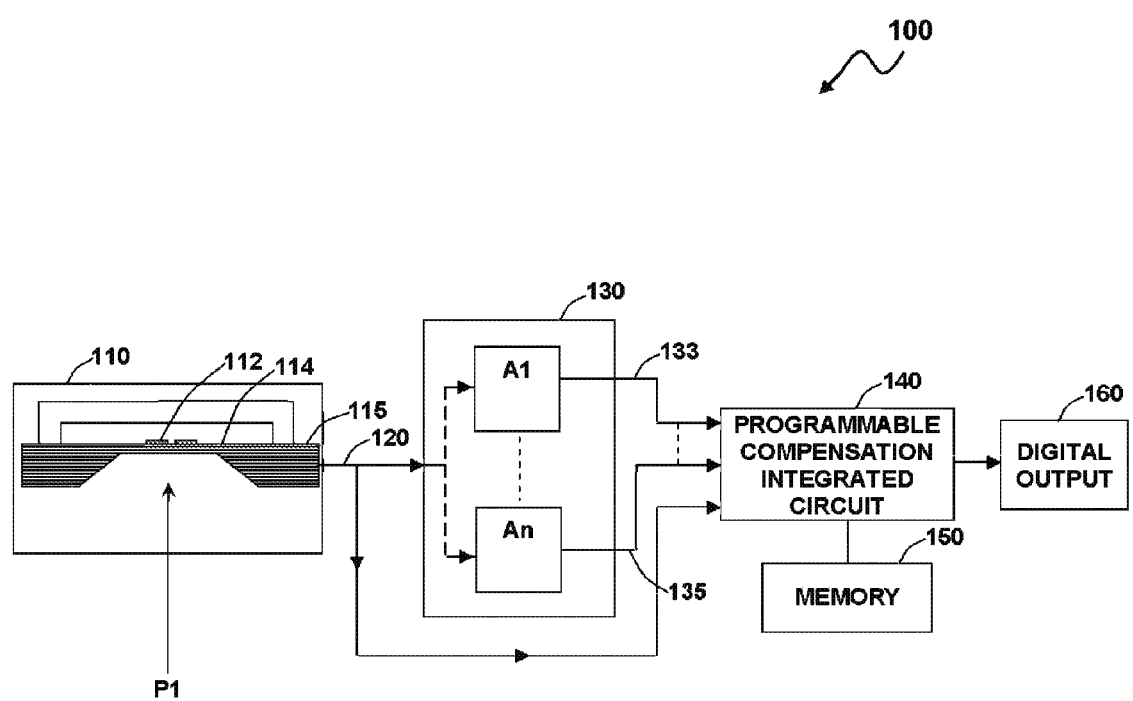
FIG. 1 illustrates a block diagram of a multi-range pressure sensor apparatus with multiple signal paths, which can be implemented in accordance with a preferred embodiment.

FIG. 1 illustrates a block diagram of a multi-range pressure sensor apparatus 100 with multiple signal paths, which can be implemented in accordance with a preferred embodiment.

The pressure sensor apparatus 100 generally includes a pressure transducer 110, an amplifier circuit 130, and a programmable compensation circuit 140. Note that the programmable compensation circuit 140 can be implemented in the form of an integrated circuit. The pressure transducer 110, amplifier circuit 130, and programmable compensation circuit 140 are capable of communicating electrically with one another. The pressure transducer 110 generally incorporates a single sense die 115 with a pressure-sensing diaphragm 114.

The sensor die 115 can also be configured to incorporate a Wheatstone bridge circuit configuration, referred to simply as a "Wheatstone bridge". One or more piezoresistors (e.g., four piezoresistors) such as piezoresistors 112 can be embedded in the diaphragm 114 at locations that maximize the output of the sensor's Wheatstone bridge (not shown). The diaphragm 114 can be deformed in accordance with the pressure P1 applied by a media. The deformation can be measured by piezoresistive elements 112 doped on a surface of the diaphragm 114.

The piezoresistive elements 112 can convert the deformation of the diaphragm 114 into electrical signals utilizing well-known piezoresistive principles in order to compute the pressure in the media. As shown in FIG. 1, a pressure is applied to the sense die 115 as indicated by arrow P1. A sensed output signal 120 from the pressure transducer 110 can be fed to an amplifier circuit 130, comprising a number of amplifiers A1-An. The amplifier circuit 130 amplifies the low-level output 120 in milli-volts to a high-level amplified output in the range of about one volt to five volts maximum. Multiple signal paths such as signal path 133 and 135 from the amplifier circuit 130 can then be transferred to a programmable compensation circuit 140 associated with a memory 150. The programmable compensation circuit 140 possesses the ability to multiplex the amplified output signals 133 and 135 and provide a digital output 160. The multiple signal paths 133 and 135, each path having a different gain, allows for multiple compensated ranges in the single transducer 110.

Such an apparatus 100 can be exposed to large overpressures without being damaged. Also, the apparatus 100 can be exposed to large overpressures without undergoing a significant pressure hysteresis. In other words, subjecting the apparatus 100 to pressures substantially greater than the pressures of the working range of the transducer 110 does not adversely affect the accuracy of the transducer 110 on subsequent measurements within the working range thereof.

Figure 2:
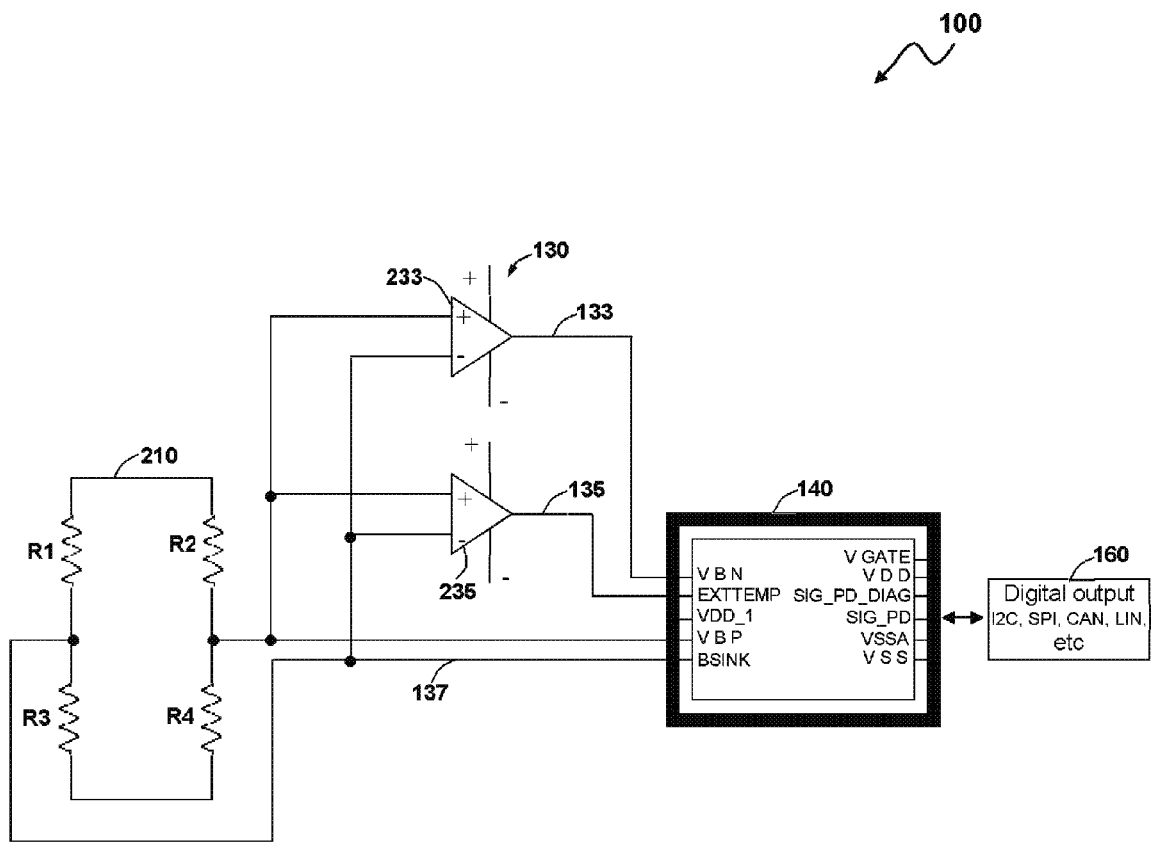
FIG. 2 illustrates a schematic diagram of the multi-range pressure sensor apparatus with multiple signal paths, in accordance with a preferred embodiment.

FIG. 2 illustrates a schematic diagram of the multi-range pressure sensor apparatus 100 with multiple signal paths, in accordance with the preferred embodiment. Note that in FIGS. 1-3, identical, similar parts, or elements are referred by identical reference numerals. A piezoelectric pressure sensing network 210 can be formed as an integral part of the pressure sense die 115 to sense flexing of the diaphragm 114 and produce an electrical signal in response thereto. The piezoelectric network 210 includes piezoresistors R1, R2, R3 and R4. Electrical connection can be provided for connecting the piezoresistors R1, R2, R3 and R4 to circuitry connection sites for associated sensor circuitry. Conductive leads can be embedded in the die 115 to connect the R1, R2, R3 and R4 in a full Wheatstone bridge configuration.

The resistors R1 and R3 forms one arm of the Wheatstone bridge 210 while the variable resistor R4 and the fixed resistor R2 make up the other arm of the bridge circuit 210. In the circuit configuration of FIG. 2, there is maximum pressure sensitivity when the piezoresistors R1, R2, R3 and R4 have similar resistances, each varying with the magnitude of the strain to which they are exposed. The resistors R1, R2, R3 and R4 can be formed in accordance with well-known metalization techniques of any material having suitable thin film resistance properties and suitable deposition characteristics. Preferably, the resistors R1, R2, R3 and R4 are formed of nickel or platinum. Additional processing or treatment apparent to those skilled in the art can be applied to the surface of pressure sense die 115 to improve robustness with respect to media compatibility and potential ionic contamination.

The electric signals from the Wheatstone Bridge 210 can be transferred to the amplifiers 233 and 235 and the programmable compensation circuit 140. The differential gain can be obtained from the multiple signal paths 133 and 135 generated by the amplifiers 233 and 235 and the direct signal path 137. It will be readily apparent that while two amplifiers 233 and 235 have been illustrated, additional amplifiers for measuring broader operative pressure ranges may be added when larger overall ranges of pressure are to be measured, each of the added amplifiers also furnishing an amplified output signal supplied as an input to the programmable integrated circuit 140.

The programmable compensation circuit 140 is a versatile integrated circuit chip, the internal circuitry of which may be configured by an individual user to realize a user-specific circuit. For example, to configure a programmable compensation circuit 140, the user configures an on-chip interconnect structure of the programmable IC 140 so that selected input terminals such as VBN, EXTTEMP, VDD_1, VBP, BSINK and selected output terminals such as VGATE, VDD, SIG_P-D_DIAG, SIG_PD, VSSA, VSS of selected on-chip circuit components are electrically connected together in such a way that the resulting circuit is the user-specific circuit desired by the user. The programmable compensation circuit 140 receives signals 133 and 135 and the direct signal 137 to produce the separate compensation for each of the different signal paths. Such compensation values can be stored in the memory 150 for each signal path, which allows high accuracy compensation at low system cost. The sensor apparatus 100 comprises either a stand-alone memory IC or with memory integral to the programmable compensation circuit 140, which provides separate compensations for each of the different signal paths. Such an approach removes errors due to amplifier gain and offset.

Figure 3:
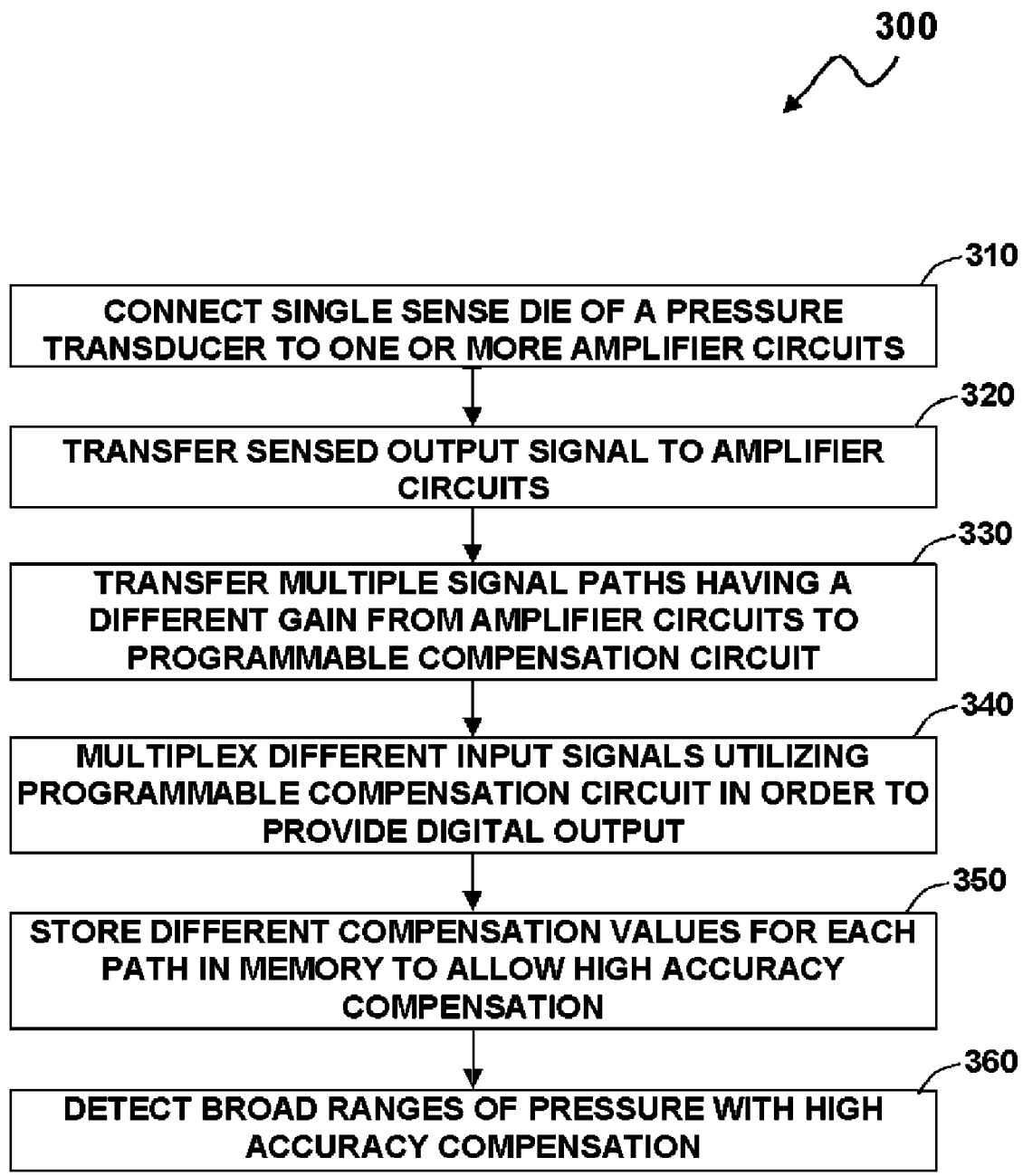
FIG. 3 illustrates a flow chart of operations illustrating logical operational steps of a method for sensing broad ranges of pressures with high accuracy utilizing the multi-range pressure sensor apparatus with a single sense die and multiple signal paths, which can be implemented in accordance with an alternative embodiment.

FIG. 3 illustrates a flow chart of operations illustrating logical operational steps of a method 300 for sensing broad ranges of pressures with high accuracy utilizing the multi-range pressure sensor apparatus 100 with a single sense die and multiple signal paths, which can be implemented in accordance with an alternative embodiment. A single sense die 115 of the pressure transducer 110 can be connected to the amplifier circuit 130 comprising one or more amplifiers 233 and 235, as depicted at block 310. Thereafter, as indicated at block 320, the sensed output signal from the pressure transducer 110 can be transferred to the amplifier circuits 130. The multiple signal paths 133 and 135, having a different gain from amplifier circuits 130, can then be transferred to a programmable compensation circuit 140, as illustrated at block 330. The different input signals 133 and 135 can be multiplexed utilizing programmable compensation circuit 140 in order to provide digital output 160, for which compensation values can be provided, as depicted at block 340.

The compensation values for each of the different signal paths 133 and 135 can be stored in the memory 150 integrated to the programmable integrated circuit 140 to allow high accuracy compensation, as indicated at block 350. The multi-range pressure sensor apparatus 100 detects broad ranges of pressure with high-pressure compensation, as shown at block 360. The multiple signal paths of the sense die 115 with potentially different compensation values stored for each path can generate high accuracy compensations at a low system cost. Each path of the multiple signal paths possesses a different gain that can provide multiple compensated ranges in the pressure sensor. The amplifier circuits 140 of the pressure sensor 110 can be integral to the sense die 115, integral to the programmable compensation circuit 140, or isolated to provide error free output generated due to amplifier gain and offset.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A multi-range pressure sensor apparatus, comprising:
   a pressure transducer comprising a sense die having a plurality of piezoresistive elements situated in a bridge configuration for transducing a pressure force into an electrical output signal;
   at least two amplifiers, each of the at least two amplifiers having an input and an output, wherein the input of each of the at least two amplifiers is electrically coupled to the electrical output signal of the pressure transducer, and each of the at least two amplifiers has a different gain than the other of the at least two amplifiers; and
   a programmable compensation circuit coupled to the outputs of the at least two amplifiers, wherein said programmable compensation circuit selects between the outputs of the at least two amplifiers to produce a digital output that corresponds to the selected amplifier output.

2. The apparatus of the claim 1, wherein the programmable compensation circuit includes a memory that stores separate compensations for each of the at least two amplifiers.

3. The apparatus of the claim 2 wherein said memory comprises a standalone memory integrated circuit.

4. The apparatus of the claim 2 wherein said memory is integral to said programmable compensation circuit.

5. The apparatus of the claim 1 wherein said programmable compensation circuit provides separate compensations for each of the at least two amplifiers.

6. The apparatus of the claim 1 wherein said at least two amplifiers are integrated with said sense die.

7. The apparatus of the claim 1 wherein said at least two amplifiers are integrated with said programmable compensation circuit.

8. The apparatus of the claim 1 wherein said at least two amplifiers are separate from said sense die and said programmable compensation circuit.

9. A multi-range pressure sensor apparatus, comprising:
   a pressure transducer comprising a sense die having a plurality of piezoresistive elements integrated with said sense die in a bridge configuration for transducing a pressure force into an electrical output signal;
   at least two amplifiers, each of the at least two amplifiers having an input and an output, wherein the input of each of the at least two amplifiers is electrically coupled to the electrical output signal of the pressure transducer, and each of the at least two amplifiers has a different gain than the other of the at least two amplifiers;
   a programmable compensation circuit coupled to the outputs of the at least two amplifiers; and
   a memory integrated with said programmable compensation circuit, wherein said memory stores separate compensations for each of the at least two amplifiers;
   wherein said programmable compensation circuit selects between the outputs of the at least two amplifiers, applies the compensations that corresponding to the selected amplifier output, and generates a digital output that corresponds to the selected amplifier output.

10. The apparatus of the claim 9 wherein said memory comprises a standalone memory integrated circuit.

11. The apparatus of the claim 9 wherein said memory is integral to said programmable compensation circuit.

12. The apparatus of the claim 9 wherein said programmable compensation circuit includes a multiplexer for selecting a particular output of the at least two amplifiers while deselecting the other outputs of the at least two amplifiers.

13. A multi-range pressure sensing method, said method comprising:
    sensing a fluid pressure;
    transducing the fluid pressure into an electrical output signal;
    amplifying the electrical output signal with a first amplifier having a first gain to produce a first amplifier output signal;
    amplifying the electrical output signal with a second amplifier having a second gain to produce a second amplifier output signal, wherein the second gain is different from the first gain;
    selecting one of the a first amplifier output signal or second amplifier output signal, resulting in a selected amplifier output signal;
    applying compensation parameters to the selected amplifier output signal, wherein the applied compensation parameters are dependent on whether the first amplifier output signal or second amplifier output signal was selected; and
    outputting a compensated output signal.

14. The method of the claim 13, wherein said applying step is performed by a programmable compensation device, wherein the programmable compensation device includes a memory for storing separate compensations for each of the first amplifier output signal and the second amplifier output signal.

15. The method of the claim 14 further comprising configuring said memory to store separate compensations for each of the first amplifier output signal and the second amplifier output signal.

16. The method of the claim 14 configuring said memory to be integral with said programmable compensation device.

17. The method of the claim 13 comprising:
    selecting the first amplifier output signal, applying compensation parameters that correspond to the first amplifier output signal, and outputting a first compensated output signal; and then
    selecting the second amplifier output signal, applying compensation parameters that correspond to the second amplifier output signal, and outputting a second compensated output signal.

18. The method of the claim 13 wherein the selecting step selects the first amplifier output signal when the fluid pressure is below a first threshold value.

19. The method of claim 18, wherein the selecting step selects the second amplifier output signal when the fluid pressure is above the first threshold value.

20. The method of the claim 13, wherein said applying step is performed using a programmable compensation device.

21. The method of the claim 13, wherein said selecting step is performed using a multiplexer.

22. An integrated circuit for processing an output signal from a sensor transducer, comprising:

at least two amplifiers, each of the at least two amplifiers having an input and an output, wherein the input of each of the at least two amplifiers is configured to be in communication with the output signal of the sensor transducer, and each of the at least two amplifiers has a different gain than the other of the at least two amplifiers; and a circuit coupled to the outputs of the at least two amplifiers, wherein said circuit selects between the outputs of the at least two amplifiers to produce an output that corresponds to the selected amplifier output.

23. The integrated circuit of claim 22, further comprising an input terminal for receiving the output signal from the sensor transducer, and where the input of each of the at least two amplifiers is in communication with the input terminal.

24. The integrated circuit of claim 23, further comprising an output terminal, wherein the output that corresponds to the selected amplifier output is provided to the output terminal.

25. The integrated circuit of claim 22, wherein said circuit applies compensations that are particular to the selected amplifier output, and generates a digital output that corresponds to the selected amplifier output.

26. A multi-range module for processing an output signal from a sensor transducer, comprising:

at least two amplifiers, each of the at least two amplifiers having an input and an output, wherein the input of each of the at least two amplifiers is configured to be in communication with the output signal of the sensor transducer, and each of the at least two amplifiers has a different gain than the other of the at least two amplifiers;

a compensation circuit coupled to the outputs of the at least two amplifiers; and a memory, wherein said memory stores separate compensations for each of the at least two amplifiers;

wherein said compensation circuit selects between the outputs of the at least two amplifiers, applies the compensations that corresponding to the selected amplifier output, and generates an output that corresponds to the selected amplifier output.

* * * * *